(12) United States Patent
Arad et al.

(10) Patent No.: US 8,077,608 B1
(45) Date of Patent: Dec. 13, 2011

(54) QUALITY OF SERVICE MARKING TECHNIQUES

(75) Inventors: Carmi Arad, Nofit (IL); Youval Nachum, Shoham (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 0 days.

(21) Appl. No.: 12/728,817

(22) Filed: Mar. 22, 2010

Related U.S. Application Data

(63) Continuation of application No. 11/334,238, filed on Jan. 17, 2006, now Pat. No. 7,697,422.

(51) Int. Cl.
*H04L 12/28* (2006.01)

(52) U.S. Cl. ........................................ 370/229; 370/467

(58) Field of Classification Search .................. 370/229, 370/465, 467, 469
See application file for complete search history.

(56) References Cited

U.S. PATENT DOCUMENTS

2003/0161338 A1   8/2003   Ng et al.
2005/0066053 A1   3/2005   McDysan

OTHER PUBLICATIONS

Cisco Systems, Catalyst 3550 Multilayer Switch Software Configuration Guide, 12.1(13) EA 1, Chapter 28, "Configuring QoS," retrieved from the Internet: <<http://www.cisco.com/univercd/cc/td/doc/product/lan/c3550/12112cea/3550scg/swqos.pdf>> on Aug. 18, 2005, 74 pgs.
Cisco Systems, Catalyst 3550 Multilayer Switches, Rel. 12.1(4) EA 1, Chapter 18, retrieved from the Internet: <<http://www.cisco.com/univercd/cc/td/doc/product/lan/c3550/1214ea1/3550scg/swqos.pdf>> on May 23, 2001, 52 pgs.

*Primary Examiner* — Melvin Marcelo

(57) ABSTRACT

A network device adapted to process data packet traffic over a telecommunication network. The network device includes an ingress pipeline adapted to receive a data packet at a port of the network device. According to embodiments of the present invention, the data packet is characterized by an external QoS attribute having M bits. The network device also includes a processor adapted to form an internal QoS Profile associated with the data packet. The internal QoS Profile includes a QoS Profile Index having M+N bits and M and N are internally assigned. The processor is also adapted to process the data packet through the network device.

20 Claims, 6 Drawing Sheets

QUALITY OF SERVICE MARKING TECHNIQUES

CROSS-REFERENCES TO RELATED APPLICATIONS

This application is a continuation application of commonly-assigned U.S. patent application Ser. No. 11/334,238, filed Jan. 17, 2006, the content of which is hereby incorporated by reference in its entirety.

BACKGROUND OF THE INVENTION

The present invention generally relates to the field of data communications. More specifically, embodiments of the present invention pertain to methods and systems for quality of service marking of data packets.

Quality of Service (QoS) for packet switched data communication networks provides preferential treatment to specific traffic in a network to ensure high-quality network performance. Without QoS, the network devices offer best-effort service to each packet. As a result, in some situations, packets are transmitted without any assurance of reliability, delay bounds, or throughput. Implementing QoS in a network makes performance more predictable and bandwidth utilization more effective. Thus, QoS methods ensure the required level of service without expanding or over-provisioning the network.

Typically, a packet is assigned a service-level (also called class-of-service) at the network edge. The method to indicate the service-level, throughout the network, depends on the packet's encapsulation standard. For example, for Ethernet packets, a 3-bit User Priority field, included in the Ethernet header, is used to indicate the service-level, providing up to 8 classes of service. For an IPvX packet, a 6-bit Differentiated Services Code Point (DSCP) field, included in the IP header, is used, providing up to 64 classes of service. In a MPLS network, a 3-bit EXP field, or the 20-bit label, in the MPLS header, are used to indicate the classes of service. These and other standards utilize various fields to propagate QoS information throughout the network, as will be evident to one of skill in the art.

The act of setting the service-level by a network device is called "QoS marking." The marking operation defines the packet internal and external QoS handling. Internal QoS handling defines the set of actions, performed on the packet by the network device, to provide the required service-level and to assure that the System Level Agreement (SLA) is met. External QoS handling defines which QoS related fields in the packet header are modified by the network device in order to propagate the assigned service level throughout the network.

In some conventional switches, the packet's external marking is mapped at ingress to an internal DSCP value. In these conventional switches, IP traffic is generally mapped from the external DSCP value to the internal DSCP field without reclassification. For Ethernet traffic, the 3-bit User Priority field is mapped to the internal DSCP field using an 8-level to 64-level class of service map. Various maps or tables are used to generate the internal DSCP values for other types of traffic. The internal DSCP value is used as a single parameter that assigns the internal as well as the external QoS handling. In these conventional switches, the number of service levels is limited to 64 classes and the network administrator cannot control which QoS fields in the packet header are used to propagate QoS information. Some applications require more than 64 service levels or a stringent control over packet header modification. Thus, there is a need in the art for improved methods and techniques of marking packets

SUMMARY OF THE INVENTION

According to an embodiment of the present invention, a method of implementing QoS in a telecommunication network is provided. The method includes receiving a data packet at a port of a network device. The data packet is characterized by an external QoS attribute having M bits. The method also includes forming an internal QoS Profile associated with the data packet. The internal QoS Profile includes a QoS Profile Index having M+N bits. According to embodiments of the present invention, M and N are internally assigned. In a particular embodiment, N is internally assigned based on a port configuration, a trust mode for the port, a trust mode for the data packet, or a selection by a policy engine. The method further includes processing the data packet through the network device.

According to another embodiment of the present invention, a method of defining a QoS Profile associated with a data packet is provided. The method includes receiving the data packet at a network device and assigning a first QoS attribute to the QoS Profile associated with the data packet. The method also includes assigning a second QoS attribute to the QoS Profile associated with the data packet. In embodiments of the present invention, the second QoS attribute includes a QoS Precedence indicator. The method further includes processing the data packet through the network device. The second QoS attribute prevents modification of the first QoS attribute. The method additionally includes setting at least one QoS field in a header of the data packet on egress from the network device. According to an embodiment, the at least one QoS field is set in accordance with the first QoS attribute.

According to yet another embodiment of the present invention, a method of preserving a state of an external QoS attribute in a telecommunication network is provided. The method includes receiving a data packet at a network device. An external QoS attribute is associated with the data packet. The method also includes defining an internal QoS attribute associated with the data packet. According to embodiments of the present invention, the internal QoS attribute includes a QoS Profile Index. The method further includes defining a internal enable modify indicator associated with the data packet and processing the data packet through the network device. The internal enable modify indicator prevents modification of the external QoS attribute, thereby preserving the external QoS attribute in an unchanged state on egress from the network device.

According to an alternative embodiment of the present invention, a network device adapted to process data packet traffic over a telecommunication network is provided. The network device includes an ingress pipeline adapted to receive a data packet at a port of the network device. The data packet is characterized by an external QoS attribute having M bits. The network device also includes a processor adapted to form an internal QoS Profile associated with the data packet. According to an embodiment, the internal QoS Profile includes a QoS Profile Index having M+N bits and M and N are internally assigned. The processor is also adapted to process the data packet through the network device.

According to another alternative embodiment of the present invention, a network device adapted to define a QoS Profile associated with a data packet is provided. The network device includes an input port adapted to receive the data packet at the network device. The network device also includes an ingress pipeline adapted to assign a first QoS attribute to the QoS Profile associated with the data packet. The ingress pipeline is also adapted to assign a second QoS attribute to the QoS Profile associated with the data packet. According to an embodiment, the second QoS attribute includes a QoS Precedence indicator. The network device further includes a processor adapted to process the data packet through the network device. In embodiments, the second QoS attribute prevents modification of the first QoS attribute. The network device additionally includes an egress pipeline including an egress packet header marking engine adapted to set at least one QoS field in a header of the data packet on egress from the network device. The at least one QoS field is set in accordance with the first QoS attribute.

According to yet another alternative embodiment of the present invention, a network device adapted to preserve a state of an external QoS attribute in a telecommunication network is provided. The network device includes an ingress pipeline adapted to receive a data packet at the network device. An external QoS attribute is associated with the data packet. The network device also includes a processor adapted to define an internal QoS attribute associated with the data packet. According to an embodiment, the internal QoS attribute includes a QoS Profile Index. The processor is also adapted to define an internal enable modify indicator associated with the data packet and process the data packet through the network device. The internal enable modify indicator prevents modification of the external QoS attribute, thereby preserving the external QoS attribute in an unchanged state on egress from the network device.

According to another specific embodiment of the present invention, a network device adapted to process data packet traffic over a telecommunication network is provided. The network device includes means for receiving a data packet at a port of the network device. The data packet is characterized by an external QoS attribute having M bits. The network device also includes means for forming an internal QoS Profile associated with the data packet. According to embodiments of the present invention, the internal QoS Profile includes a QoS Profile Index having M+N bits and M and N are internally assigned. The network device further includes means for processing the data packet through the network device.

According to a particular embodiment, a network device adapted to define a QoS Profile associated with a data packet is provided. The network device includes means for receiving the data packet at a network device and assigning a first QoS attribute to the QoS Profile associated with the data packet. The network device also includes means for assigning a second QoS attribute to the QoS Profile associated with the data packet. In embodiments of the present invention, the second QoS attribute includes a QoS Precedence indicator. The network device further includes means for processing the data packet through the network device. The second QoS attribute prevents modification of the first QoS attribute. The network device additionally includes means for setting at least one QoS field in a header of the data packet on egress from the network device. According to an embodiment, the at least one QoS field is set in accordance with the first QoS attribute.

According to another particular embodiment of the present invention, a network device adapted to preserve a state of an external QoS attribute in a telecommunication network is provided. The network device includes means for receiving a data packet at a network device. An external QoS attribute is associated with the data packet. The network device also includes means for defining an internal QoS attribute associated with the data packet. According to embodiments of the present invention, the internal QoS attribute includes a QoS Profile Index. The network device further includes means for defining a internal enable modify indicator associated with the data packet and processing the data packet through the network device. The internal enable modify indicator prevents modification of the external QoS attribute, thereby preserving the external QoS attribute in an unchanged state on egress from the network device.

Still other embodiments of the present invention may be implemented in code, for example, by a digital signal processor (DSP). One such embodiment includes code for receiving a data packet at a port of the network device. In embodiments, the data packet is characterized by an external QoS attribute having M bits. The DSP also includes code for forming an internal QoS Profile associated with the data packet. The internal QoS Profile includes a QoS Profile Index having M+N bits and M and N are internally assigned. The DSP further includes code for processing the data packet through the network device.

Another embodiment implemented in code, for example, by a DSP, includes code for receiving the data packet at a network device and assigning a first QoS attribute to the QoS Profile associated with the data packet. The embodiment also includes code for assigning a second QoS attribute to the QoS Profile associated with the data packet. The embodiment further includes code for processing the data packet through the network device. The second QoS attribute prevents modification of the first QoS attribute. The embodiment additionally includes code for setting at least one QoS field in a header of the data packet on egress from the network device. According to an embodiment, the at least one QoS field is set in accordance with the first QoS attribute.

Yet another embodiment implemented in code, for example, by a DSP, includes code for receiving a data packet at a network device. An external QoS attribute is associated with the data packet. The embodiment also includes code for defining an internal QoS attribute associated with the data packet. The embodiment further includes code for defining a internal enable modify indicator associated with the data packet and processing the data packet through the network device. The internal enable modify indicator prevents modification of the external QoS attribute, thereby preserving the external QoS attribute in an unchanged state on egress from the network device.

Many benefits are achieved by way of the present invention over conventional techniques. For example, embodiments of the present invention provide an internal service indication characterized by an increased number of QoS levels compared to conventional techniques. Moreover, some embodiments provide methods of controlling packet QoS modifications at ingress. Additionally, embodiments of the present invention prevent modification of a packet QoS by subsequent stages of the switch. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1A:
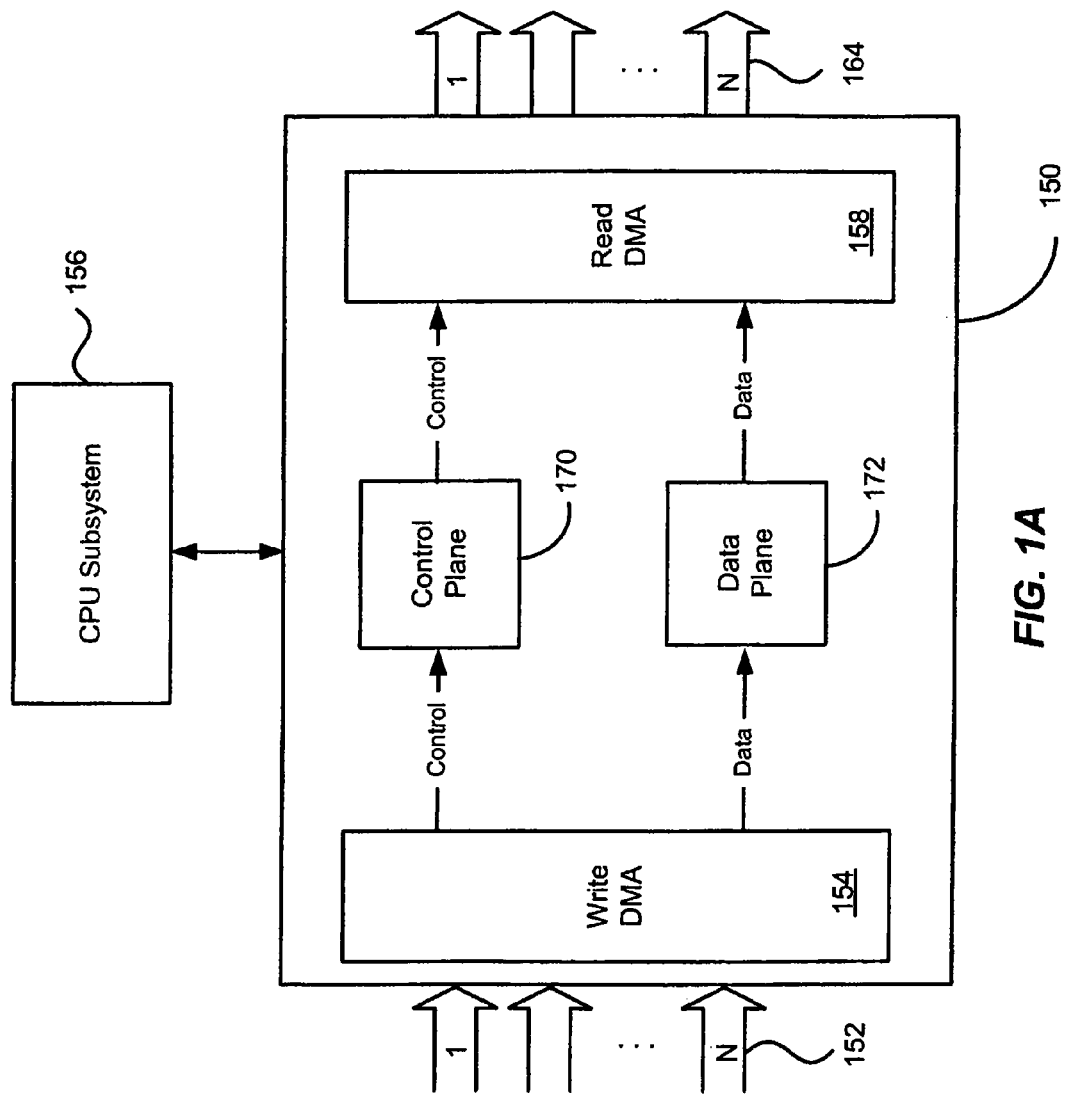
FIG. 1A is a simplified block diagram of a network device provided according to an embodiment of the present invention.

FIG. 1A is a simplified block diagram of a network device provided according to an embodiment of the present invention. As illustrated in FIG. 1A, the network device 150 includes, in part, a number (1-N) of ports 152 adapted to receive data packets from the network, for example, a telecommunications network. Ports 152 are configurable to provide levels of service depending on the type of traffic received at the particular port or other parameters. The ports are coupled to a direct memory access machine (DMA) machine (Write DMA 154) that writes packets to buffering memory. The Write DMA 154 is coupled to a Control Plane 170. As discussed more fully below, particularly with reference to FIG. 1B, various stages of QoS processing are performed by several QoS marking engines associated with the Control Plane 170. The network device is coupled to CPU 156 adapted to monitor and control traffic flow through the network device 150. Although not illustrated in FIG. 1A, the network device 150 and the CPU 156 are coupled to one or more memories.

The Write DMA 154 is also coupled to a Data Plane 172. As illustrated in FIG. 1A, control and data pass from the Write DMA 154 through the Control Plane 170 and the Data Plane 172, respectively, to the Read DMA 158. The Read DMA 158 is a machine that reads packets from buffering memory and is coupled to a number (1-N) of output ports 164. As will be evident to one of skill in the art, the simplified block diagram illustrated in FIG. 1A omits various elements for purposes of clarity. Accordingly, embodiments of the present invention are not limited to the illustrations shown in FIG. 1A but include elements that are added, removed, combined, or separated.

Figure 1B:
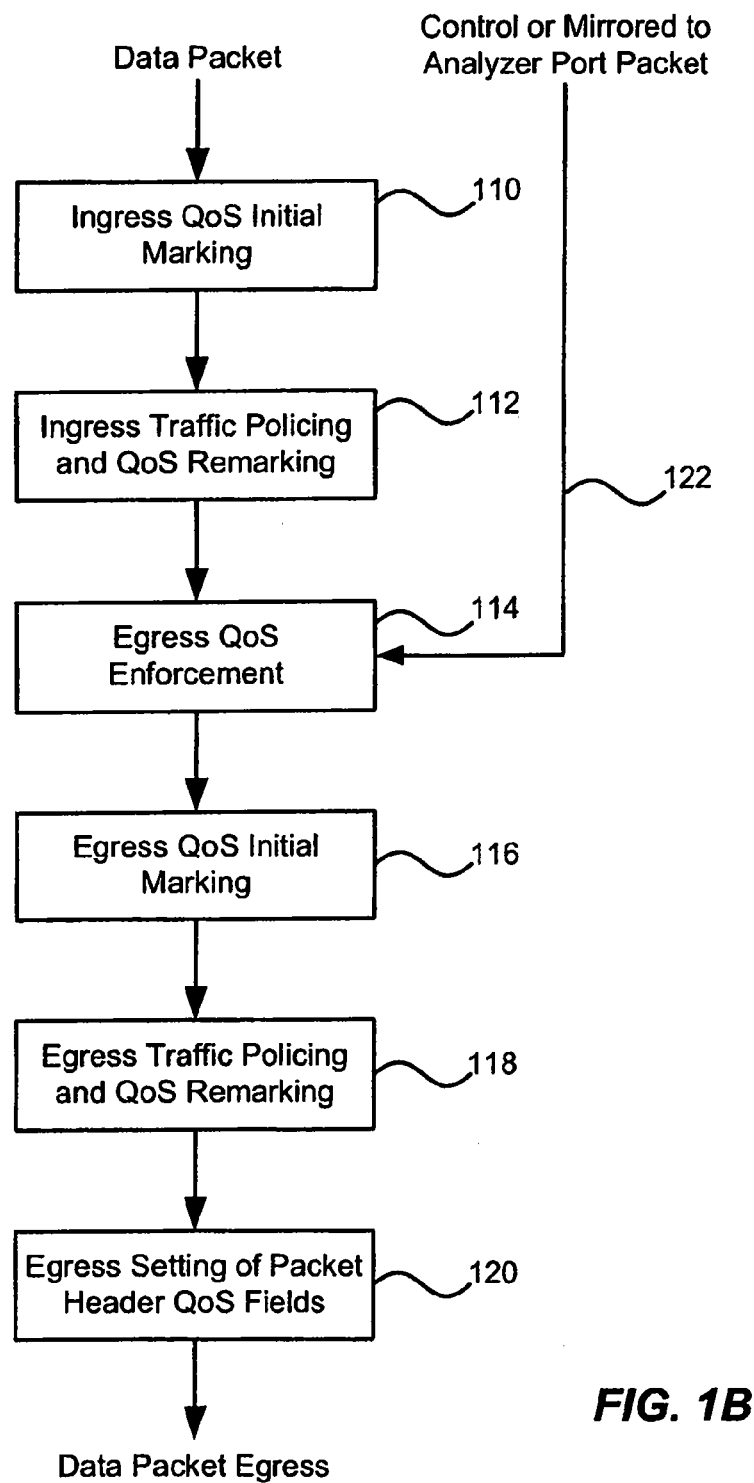
FIG. 1B is a simplified flowchart illustrating QoS processing according to an embodiment of the present invention.

FIG. 1B is a simplified flowchart illustrating QoS processing according to an embodiment of the present invention. The ingress and egress QoS processing shown in FIG. 1B is performed by components of the Control Plane 170 as shown in FIG. 1A. A data packet is received by a network device, for example a switch. The network device incorporates multiple QoS markers operating in sequence. The first two stages of QoS processing, Ingress QoS Initial Marking (110) and Ingress Traffic Policing and QoS Remarking (112) are performed in the ingress pipeline (ingress control pipe 154). Traffic policing (112) meters the given flow according to a configurable rate profile and classifies packets as either in-profile or out-of-profile. Out-of-profile packets may be discarded or have their QoS attributes remarked. The QoS Remarker (112) can modify the initially defined QoS attributes, for example, during traffic policing, as will be evident to one of skill in the art.

The next three stages, Egress QoS Enforcement (114), Egress QoS Initial Marking (116), and Egress Traffic Policing and QoS Remarking (118) are performed in the egress pipeline (egress control pipe 162). Egress QoS enforcement (114) is performed in the network device and utilizes eight priority egress queues per port. In other embodiments, a different number of priority egress queues per port are utilized depending on the particular application. Generally, congestion avoidance and congestion resolution techniques are used to provide the required service. The last stage illustrated in FIG. 1B, Egress Setting of Packet Header QoS Fields (120) is also performed in the egress pipeline 154. Subsequent devices within the network core provide consistent QoS treatment to traffic, based on the packet's 802.1p or DSCP marking. As a result, end-to-end QoS solutions are provided.

As illustrated by traffic flow 122, traffic classified as Control or Mirrored to Analyzer Port Packets are not subject to Ingress QoS Initial Marking or Ingress Traffic Policing and QoS Remarking, but enter the flow illustrated in FIG. 1B at step 114. As will be evident to one of skill in the art, network devices provided according to embodiments of the present invention incorporate QoS features implemented at the network-edge as well as in the network core, including switches and routers. It is understood that processors described herein, including packet processors, may include one or more general purpose processors configured to execute instructions and data. In some embodiments, the processing of the packets may be carried out using dedicated hardware such as an application specific integrated circuit (ASIC). In yet other embodiments, the processing of the packets may be carried out using a combination of software and hardware. As an example, such processors include dedicated circuitry, ASICs, other programmable processors, combinations thereof, and the like. Thus, processors as provided herein are defined broadly and include packet processors adapted to manage network traffic, but are not limited to packet processors.

Ingress QoS Initial Marking (110) associates a set of internal QoS attributes with the packets classified as Data. The internal QoS attributes are stored in the QoS Profile and determine the QoS processing performed by subsequent stages of the device. Because multiple QoS marking engines operate sequentially, a later marking engine may override the QoS attributes defined by an earlier marking engine. In some embodiments of the present invention, the QoS implementation in the network device complies with the IETF-DiffServ and IEEE-802.1p standards.

The QoS Profile is provided as a portion of the Distributed Switch Architecture (DSA) tag, which is an extended eight bit tag. The following provides a description of a QoS Profile according to an embodiment of the present invention. One of ordinary skill in the art would recognize many variations, modifications, and alternatives. As discussed in additional detail in U.S. patent application Ser. No. 10/829,866, filed Apr. 21, 2004 and incorporated herein by reference in its entirety for all purposes, the DSA tag provides logical signatures related to the packet. As will be evident to one of skill in the art, through the use of the DSA tag formats, packets sent between cascaded devices (e.g., interconnected integrated circuit devices) are characterized by tightly coupled QoS for a distributed system (e.g., a stack or a chassis). Moreover, conveying the QoS Profile in the DSA tag provides the flexibility to connect devices with different QoS enforcement capabilities to the same stack. For example, devices with different number of priority queues per network port are connected to the same stack according to embodiments of the present invention. Each device maps the QoS Profile to a priority queue according to the number of queues per network port. One of ordinary skill in the art would recognize many variations, modifications, and alternatives.

The QoS Profile includes a QoS Profile Index, a QoS Precedence flag, a Modify DSCP flag, and a Modify User Priority flag. The QoS Profile Index is a flexible mechanism that provides an internal QoS attribute defining the service level for the packet. According to embodiments of the present invention, the QoS Profile Index enables the network device to support a predetermined number of QoS service levels, for example 128 or more QoS service levels. Merely by way of example, external QoS attributes associated with a packet, such as the priority header information in an IP packet (e.g., DSCP field) may be mapped to the QoS Profile Index. In one embodiment, the eight service levels associated with Ethernet packets, which have a 3-bit User Priority field, can be mapped to a 7-bit internal QoS Profile Index, which provides 128 service levels. Thus, an N-bit external QoS attribute can be mapped to an M+N-bit internal QoS attribute, providing additional service levels or additional control over packet processing.

Moreover, traffic received on a given port may be assigned a QoS service level based on the port configuration with the service level information stored in the QoS Profile Index. The QoS Profile Index is used by the network device for internal QoS processing as well as by the egress pipeline to define the external QoS service level for the data packet. As an example, on egress, the packet header may have its User Priority, EXP, and/or DSCP fields set to reflect the QoS assignment as defined by the QoS Profile Index.

The QoS Profile Index provides a direct index, ranging from 0 to 127 in an embodiment, into the global QoS Profile Table. The QoS Profile Table holds information used to enforce the service and the values of fields in the packet header in turn are used to indicate the assigned service in the network. The content of this table can vary from application to application, according to the mechanisms used by the device to enforce the service or according to the supported packet-encapsulation standards. As an example, the QoS Profile Table includes fields for traffic class, drop precedence, User Priority, DSCP, and EXP. In an embodiment, the EXP field resides is a separate physical table from the rest of the QoS Profile entry fields.

According to embodiments of the present invention, the application is free to configure the available QoS Profile Index values in any suitable fashion. When supporting DiffServ and 802.1p, one approach is to assign QoS Profile Index values 0-63 for DiffServ PHBs and QoS Profile Index values 64-71 for 802.1p User Priorities. Moreover, flexible mechanisms for marking, policing, and re-marking QoS levels, as well as setting packet headers associated with QoS at egress are provided. For example, extending the QoS Profile to support future standards is provided by embodiments of the present invention. Merely by way of example, in a network device that does not initially support MPLS traffic, extending support to include MPLS is provided by making modifications to the QoS Profile Table and not the entire system architecture. In this example of extending support to include MPLS, the existing QoS Profile Table is extended to include a mapping for the additional standard, namely from the EXP field to the QoS Profile Index. Additional standards are incorporated in a similar manner. One of ordinary skill in the art would recognize many variations, modifications, and alternatives.

The QoS Precedence flag is another QoS attribute included in the QoS Profile and is utilized to prevent modification of internal packet QoS attributes by subsequent QoS markers. QoS Precedence flag settings include:
 Flag 0=SOFT QoS Precedence: Subsequent QoS markers can override the existing packet QoS attributes assigned by a previous marker, and
 Flag 1=HARD QoS Precedence: Subsequent QoS markers cannot override the existing QoS attributes that were assigned by a previous marker.

As an example of the use of the QoS Precedence flag, in some network devices, a policy-based QoS marking engine precedes an FDB-based QoS marking engine. A policy engine is usually adapted to utilize more information, such as flow information, in the QoS marking decision than an FDB engine, which examines the MAC address and selects the port for egress. Thus, it is usually not desirable to override the QoS marking performed at the policy engine by remarking the packet at the FDB engine. Thus, the policy engine can set the QoS Precedence flag to HARD after performing QoS marking, thus preventing the FDB engine from overriding the QoS attributes and remarking the QoS attributes.

On the other hand, in a particular embodiment of the present invention, it is advantageous to override previous marking decisions. Merely by way of example, after a first QoS marking operation is performed and the QoS Precedence flag is set to a zero value, indicating a SOFT QoS Precedence. In some embodiments, the default value for the QoS Precedence flag is a SOFT QoS Precedence. A second QoS marking operation is performed, remarking the QoS attributes and then setting the QoS Precedence flag. As an example, port-based QoS marking, described more fully below, assigns several packet QoS attributes based on the ingress port configuration. Subsequently, a policy-based QoS marking engine examines the flow configuration along with other information. Based on the information available, the policy-based QoS marking engine remarks the packet and then sets the QoS Precedence flag in a particular example. Setting of the QoS Precedence flag by the policy-based QoS marking engine prevents remarking of the QoS attributes by subsequent marking engines. In an alternative embodiment, the policy-based QoS marking engine remarks the packet, but does not set the QoS Precedence flag, providing an opportunity for additional downstream engines to perform additional QoS remarking operations.

Embodiments of the present invention also provide for overriding of the QoS Precedence flag. Merely by way of example, according to embodiments of the present invention, a traffic policer QoS remarker can modify packet QoS attributes, including the QoS Profile Index, regardless of the QoS Precedence flag setting. Thus, a system designer is able to determine which of the various QoS marking engines are subject to the QoS Precedence flag, providing flexibility and control over the marking and remarking operations performed as the data packet transits the network device.

QoS attributes included in the QoS Profile also include the Modify DSCP QoS parameter for IP packets and the Modify User Priority QoS parameter for Ethernet packets. The Modify DSCP QoS parameter is set at a predetermined value to determine the modifications performed on the packet DSCP field. If the Modify DSCP field is set to a zero or "OFF" value, the packet DSCP field is not modified when the packet egresses the device. Thus, for IPv4 and IPv6 packets, the initial value of the DSCP field on ingress is preserved and used to set the DSCP value associated with the packet on egress. On the other hand, if the Modify DSCP field is set to a one or "ON" value, the packet DSCP field is modified to the DSCP value of the QoS Profile entry for the packet's QoS Profile Index on egress. Thus, embodiments of the present invention provide for enhanced control over setting and modifying the QoS attributes associated with IPv4/6 packets moving through the network.

Utilizing the Modify DSCP QoS parameter, embodiments of the present invention map the DSCP field of an IP packet to the QoS Profile Index on ingress and then preserve the DSCP field unchanged on egress. Using the internal QoS Profile Index, various QoS services are provided as the packet moves through the network device. However, priority information in the packet header, namely the DSCP field, is not modified by the network device. Thus, by setting the Modify DSCP QoS parameter to a predetermined value, internal QoS services are provided through the use of the QoS Profile Index while the DSCP field is unchanged on egress. Accordingly, the packet priority on egress is unchanged from the packet priority on ingress, making the internal QoS services transparent when viewed from outside the network device.

The Modify User Priority field provides control over the modification of the packet 802.1p-User Priority field for Ethernet traffic. If the Modify User Priority field is set to a zero or "OFF" value, the packet User Priority is preserved at the service level associated with the packet at ingress when the packet egresses the device. Thus, the initial value of the 802.1p User Priority field associated with the packet on ingress is used to set the User Priority field in the header of the transmitted packet. On the other hand, if the Modify User Priority field is set to a one or "ON" value, the packet User Priority field is modified to the User Priority value of the QoS Profile entry for the packet's QoS Profile Index when the packet egresses the device. In some embodiments, this flag is relevant when a VLAN tag is added or modified when the packet egress the device.

Moreover, new standards and protocols are included in embodiments of the present invention. Merely by way of example, current and future protocols utilizing priority fields other than DSCP, User Priority, and the like are included according to embodiments of the present invention. As a particular example, embodiments of the present invention would incorporate MPLS traffic with an EXP field and provide a Modify EXP flag for this particular traffic type to provide the functionality of preventing modification of the EXP field as the packet is processed by the network device. Alternatively, since a packet can be an IP packet, a MPLS packet, or other type, the Modify DSCP flag may be renamed as a Modify DSCP_EXP flag as appropriate to the particular packet attributes. One of ordinary skill in the art would recognize many variations, modifications, and alternatives. Thus, priority or QoS information associated with packets, either in the packet header or other portions of the packet, is utilized in defining the QoS Profile Index. As discussed above, the priority or QoS information associated with the packet can be maintained in an original state as the packet passes through the network device. Thus, embodiments of the present invention provide the benefits described throughout the present specification independent of the particular protocol used by the network.

Referring once again to FIG. 1B, QoS initial marking at egress (116) associates a set of QoS attributes with every packet that determine the QoS processing by subsequent stages. Potentially, all types of packets—Data, Control, and Mirrored to Analyzer Port, are subject to egress QoS initial marking. Data packets are defined as either Network-to-Network traffic (i.e., packets received on a cascade port with DSA tag <command>=FORWARD, or packets received on a network port that are assigned a <command> FORWARD or MIRROR TO CPU) or data traffic from the CPU (i.e., packets with a DSA tag <command>=FROM_CPU and DSA tag <Cascade Control> flag is clear). Control packets are categorized as packets to the CPU and packets from the CPU. Control packets to the CPU are defined as one of the following: packets sent to the CPU due to trapping, mirroring, or forwarding a data packet to the CPU by one of the ingress pipe or egress pipe engines; packets received via a cascading port with a DSA tag <command>=TO_CPU; or packets received via a cascading port with a DSA tag <command> (CPU-to-CPU traffic). Control packets from the CPU are defined as packets sent by the CPU with DSA tag <command>=FROM_CPU and DSA tag <Cascade Control> flag is set. In generally, control packets from the CPU are not targeted to another port.

Mirrored to analyzer port packets are defined as either packets received on a cascade port with a DSA tag <command>=TO_ANALYZER, or packets duplicated for either ingress or egress mirroring to analyzer port. Of course, embodiments of the present invention are not limited to these particular definitions and incorporate alternative definitions as will be evident to one of skill in the art.

Figure 2:
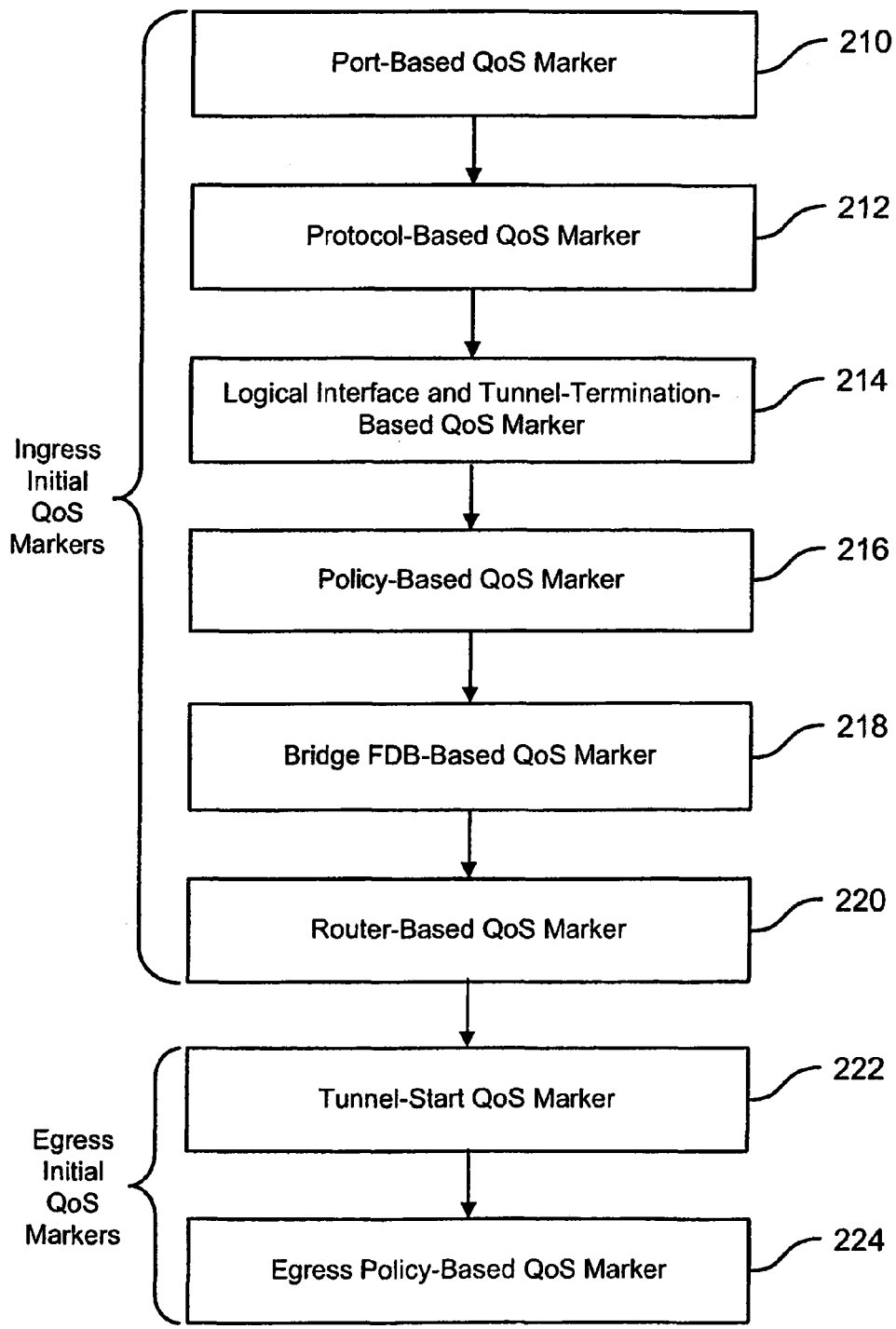
FIG. 2 is a simplified flowchart illustrating sequential marking operations according to an embodiment of the present invention.

FIG. 2 is a simplified flowchart illustrating sequential marking operations, listed according to their sequential order in the ingress pipeline. Generally, each stage in the ingress pipeline is capable of modifying the packet QoS Profile, including the QoS Profile Index.

210—Port-Based QoS Marker
    212—Protocol-Based QoS Marker
    214—Logical Interface & Tunnel-Termination-Based QoS Marker
    216—Policy-Based QoS Marker
    218—Bridge FDB-Based QoS Marker
    220—Router-Based QoS Marker
    222—Tunnel-Start QoS Marker
    224—Egress Policy-Based QoS Marker The first six QoS markers (210-220) are the ingress initial QoS markers and the last two QoS markers (222-224) are the egress initial QoS markers. As will be evident to one of skill in the art, embodiments of the present invention are not limited to the particular QoS markers illustrated in FIG. 2. In alternative embodiments, the sequential ordering of the QoS markers illustrated in FIG. 2 is modified to perform the marking operations in a different order. Moreover, other alternative embodiments of the present invention may modify the particular QoS markers, adding or removing one or more QoS markers and arranging them in a different sequence without departing form the scope of the claims herein. One of ordinary skill in the art would recognize many variations, modifications, and alternatives.

Port-Based QoS Marking

Figure 3:
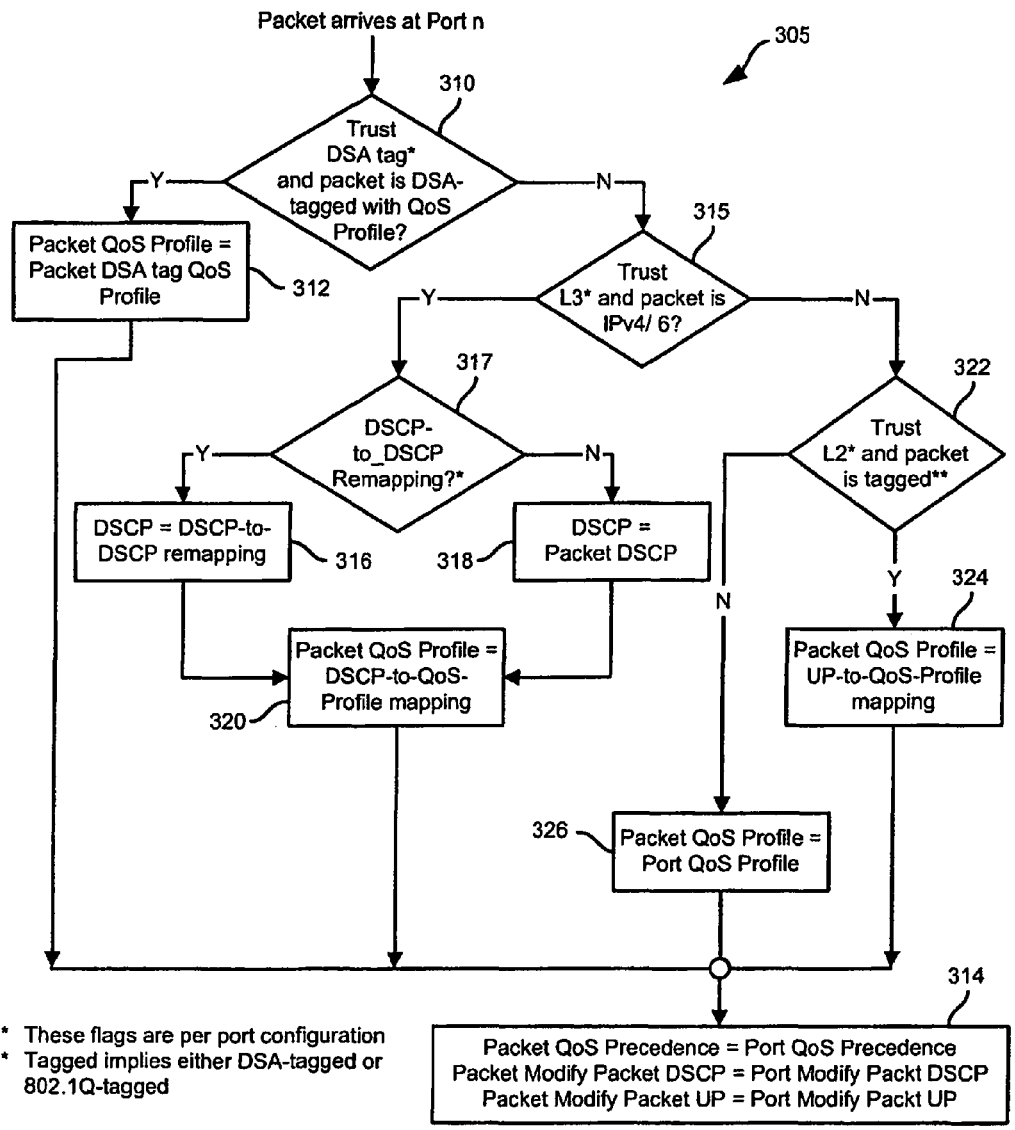
FIG. 3 is a simplified flowchart illustrating a Port-Based QoS Marking Operation according to an embodiment of the present invention.

FIG. 3 is a simplified flowchart illustrating a Port-Based QoS Marking Operation according to an embodiment of the present invention. As described more fully below, port-based QoS marking is used in accordance with the present invention to enhance the number of service levels associated with packets as well as the control exercised over the QoS attributes of packets. One of ordinary skill in the art would recognize many variations, modifications, and alternatives.

The QoS parameters associated with packets are mapped to the QoS Profile at ingress as illustrated in FIG. 3. Since the QoS Profile Index provides more than 64 levels of service, mapping is not limited, for example, to mapping the 64 level DSCP field to the QoS Profile Index, but includes other protocols or other internal QoS services. Thus, as described more fully below, definition of the QoS Profile attributes based on DSCP, User Priority, and EXP fields, trust modes, port configurations, policy engines defining service levels per flow, and the like are provided. Merely by way of example, in a network device with multiple ports, a first port with IP traffic could be configured to trust the DSCP field, using 64 of the 128 levels of service provided by an embodiment of the present invention. Additionally, a second port with IP traffic could be configured to not trust the DSCP field, thereby using additional levels of service. Moreover, a third port with Ethernet traffic could be configured to trust the User Priority field, using 8 more levels of service. Of course, one of skill in the art would recognize many variations, modifications, and alternatives. Thus, embodiments of the present invention provide additional QoS service levels compared with conventional approaches, enabling the system operator to provide enhanced QoS services.

Referring to FIG. 3, the port-based QoS marker provides port-based assignment of the following QoS attributes:
QoS Precedence
QoS Profile Index
Modify DSCP flag
Modify User Priority flag In addition, port-based QoS marking supports a default port 802.1p User Priority assignment. Assignment of the packet QoS attributes <QoS Precedence>, <Modify DSCP>, and <Modify User Priority> are based on the ingress port configuration. However, the packet QoS attribute <QoS Profile Index> is assigned according to one of the following in embodiments of the present invention:

The ingress port configuration: This approach is used when the packet QoS for a given port is not trusted, or Based on the incoming packet QoS: This approach is used when the packet QoS for a given port is trusted. If the packet does not carry the trusted type of QoS, then the packet <QoS profile> is assigned from the ingress port configuration. For tunneled traffic, the trusted packet QoS information is taken from the tunnel header.

Port QoS Trust Modes

In accordance with embodiments of the present invention, port-based QoS marking utilizing trust modes is used to enhance the number of service levels associated with packets as well as the control exercised over the QoS attributes of packets. One of ordinary skill in the art would recognize many variations, modifications, and alternatives. Network devices provided in accordance with embodiments of the present invention support the following types of port QoS Trust modes:

Layer 2 User Priority Trust Mode. The packet QoS Profile Index is assigned by mapping the packet User Priority to a QoS Profile Index. In an embodiment, this is accomplished by using a global User-Priority-to-QoS-Profile-Index mapping table. The table size is eight entries-one entry per User Priority value.

Layer 3 DSCP Trust Mode. When Layer 3 Trust mode is enabled, there is an additional sub-mode called DSCP-to-DSCP remapping, where the packet DSCP is mutated to a new DSCP, using a global DSCP-to-DSCP mapping table. This table maps the incoming packet DSCP to a new, mutated DSCP. The table size is 64 entries: one entry per DSCP value. The new DSCP is used by all subsequent functions based on the packet DSCP. The packet QoS Profile Index is assigned by mapping the packet DSCP (or remapped DSCP) to a QoS Profile Index, using a global DSCP-to-QoS-Profile-Index mapping table. The table size is 64 entries-one entry per DSCP value.

Layer 2 Trust Mode+Layer 3 Trust Mode. This allows both layers of trust to be enabled concurrently, however Layer 3 trust has precedence over Layer 2 trust. In this mode, IPv4/v6 packets are subject to Layer 3 trust mode and non-IPv4/6 packets tagged packets are subject to Layer 2 trust mode.

DSA-Tag QoS Profile Trust Mode. If the extended FORWARD DSA tag <QoS Profile> is trusted, the packet QoS Profile Index may be assigned from the incoming packet DSA tag<QoS Profile>. Typically the DSA tag <QoS Profile> is trusted, since the DSA tag is provided by other Marvell network devices. As will be evident to one of skill in the art, embodiments of the present invention provide for uniform QoS services among a number of Marvell network devices. Using the commonly defined QoS Profile, interoperability and enhanced performance are provided.

Depending on the particular trust mode used to perform packet mapping, the following four global mapping tables support the above listed port trust modes:
User-Priority-to-QoS-Profile-Index mapping table
DSCP-to-DSCP mapping table
DSCP-to-QoS-Profile-Index mapping table
EXP-to-QoS-Profile-Index mapping table
Port Default User Priority The port default User Priority is used in two ways. First, if a VLAN tag is added to the packet by the egress port and the packet QoS attribute <Modify User Priority> is disabled, the packet's tag User Priority is set according to the ingress port default User Priority. Secondly, if a packet arrives untagged, the Policy Engine search key <User Priority> is set to port default User Priority.

As illustrated in FIG. 3, a packet arrives at port n (305). A determination is made (310) of whether the DSA tag is trusted and whether the packet is DSA-tagged with a QoS profile. If both conditions are met, the packet QoS Profile Index is assigned (312) based on the packet DSA tag QoS profile. Subsequently, the other packet QoS attributes <QoS Precedence>, <Modify DSCP>, and <Modify User Priority> are based on the ingress port configuration (214). For example, this condition will typically be present in embodiments in which stacked network devices are utilized.

If, on the other hand, the determination is made that either the DSA tag is not trusted or the packet is not DSA-tagged with a QoS profile, a determination is made (315) of whether layer 3 trust mode is enabled and the packet is an IPv4/v6 packet. If layer 3 trust mode is enabled and the packet is an IPv4/v6 packet, an additional sub-mode of DSCP-to-DSCP remapping is optionally performed (317). According to some embodiments, a per port configuration flag is utilized to determine if the DSCP-to-DSCP remapping is performed. To perform DSCP-to-DSCP remapping, a global DSCP-to-DSCP mapping table is used to map the incoming packet to a new, mutated DSCP (316). If remapping is not performed, the DSCP is assigned based on the packet DSCP (318). In step 320, the packet QoS Profile Index is assigned based on the DSCP-to-QoS-Profile mapping. In embodiments in which steps 318 and 320 are used, 64 service levels provided by the QoS Profile Index are used to represent the DSCP field values. Because the number of service levels provided by embodiments of the present invention exceeds 64 service levels, additional service levels are available for the provisional of other services as described below. Thus, embodiments of the present invention provide advantages over conventional systems providing merely 64 service levels. In particular, such conventional systems would have utilized all 64 service levels after mapping the DSCP field to the QoS Profile Index, thereby not providing for the additional port-based and trust-based mapping steps as described below.

If layer 3 trust mode is not enabled or if the packet is not an IPv4/v6 packet, a determination is made (322) of whether the layer 2 User Priority trust mode is enabled and whether the packet is tagged. In this context, tagged implies either DSA-tagging or 802.1Q-tagging. If these conditions are met, the packet QoS Profile Index is assigned by mapping the packet User Priority to a QoS Profile (324) using a global User-Priority-to-QoS-Profile-Index mapping table. If layer 2 User Priority trust mode is not enabled or the packet is not tagged, the packet QoS Profile Index is assigned based on the port QoS Profile (326).

According to embodiments of the present invention, trust operation depends on the per port trust configuration being enabled and on the existence of a QoS field in the packet header. Multiple Trust Modes are enabled concurrently according to some embodiments of the present invention. Moreover, the Trusted QoS Modes have the following order of precedence, starting with the highest precedence:

1. Trust Extended FORWARD DSA tag <QoS Profile>.
2. Trust packet Layer 3 DSCP field.
3. Trust packet Layer 2 802.1p User Priority field.

Additionally, modification of packet DSCP and User Priority fields can be independently enabled. It should be noted that packet QoS modification is enabled in the ingress pipe, but it is performed in the egress pipe. As described more fully throughout the present specification, QoS precedence can be set to HARD to prevent subsequent QoS marking.

Protocol-Based QoS Marking

The protocol-based QoS marker provides protocol-based per-port assignment of the following QoS attributes:
  QoS Precedence
  QoS Profile Index
  Modify DSCP flag
  Modify User Priority flag The protocol-based QoS marker supports QoS initial marking of the packet QoS attributes, according to the packet protocol field. In this specific implementation, the packet is matched against up to 8 protocols and the initial marking configuration is provided per port. For tunneled traffic this marker operates on the tunnel-header. The QoS marking for a given port/protocol can be applied selectively as follows:

Do not QoS mark packets matching this protocol on this port.
  QoS mark only untagged packets matching this protocol on this port.
  QoS mark only VLAN-tagged, Priority-tagged, or DSA-tagged packets matching this protocol on this port.
  QoS mark all packets matching this protocol on this port. Protocol-based QoS marking updates all of the QoS attributes.

Logical Interface and Tunnel-Termination Based QoS Marking

The Logical Interface and Tunnel-Termination QoS marker is applied only on tunnel-terminated traffic and is bypassed by other traffic types. The Logical Interface and Tunnel-Termination QoS marker provides three basic modes of operation:

Assign default QoS-Profile Index per Tunnel-Termination entry.
  Trust the tunnel-header.
  Trust the passenger-header.

Figure 4:
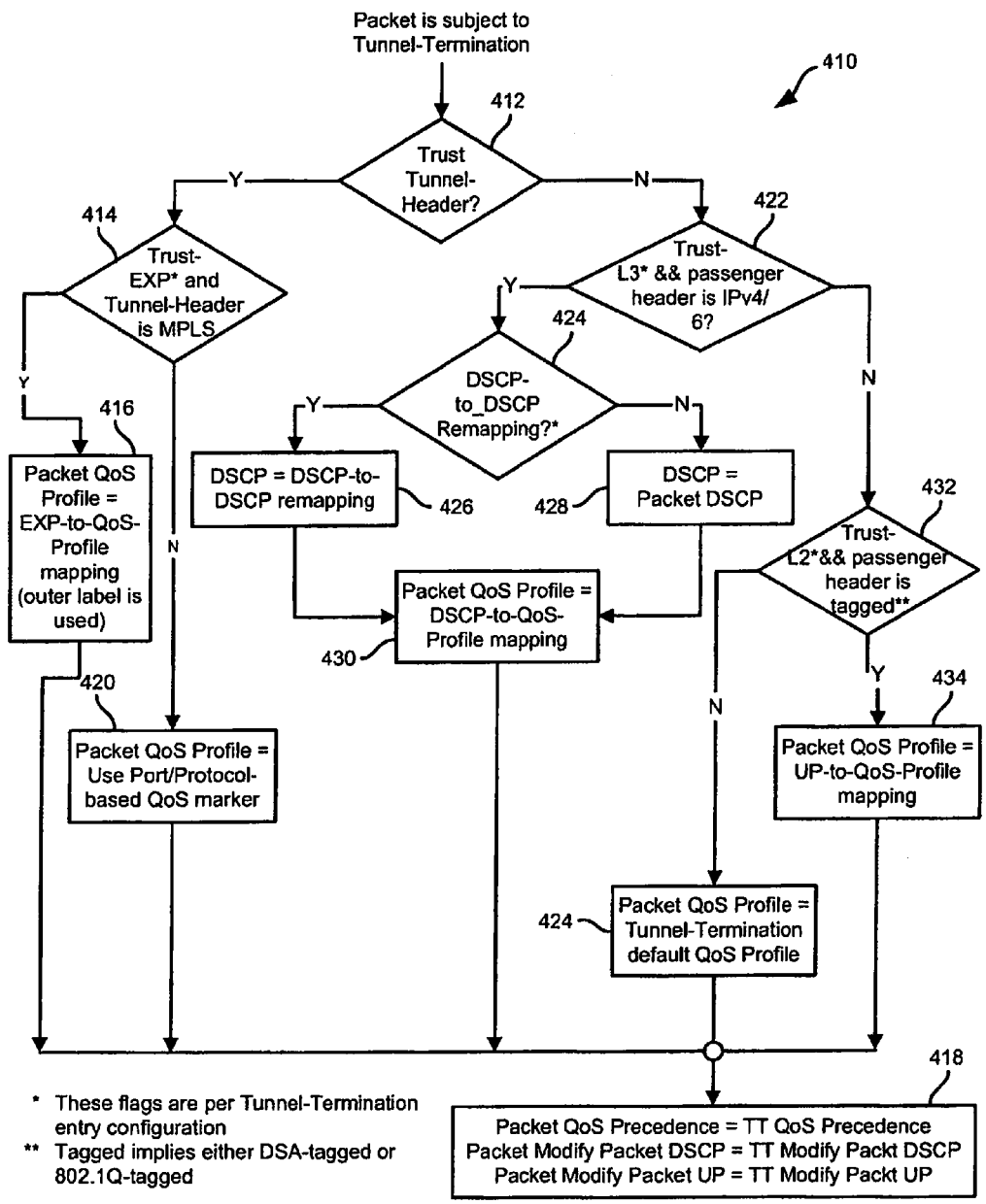
FIG. 4 is a simplified flowchart illustrating a Logical Interface and Tunnel-Termination-Based QoS Marking Operation according to an embodiment of the present invention.
Figure 5:
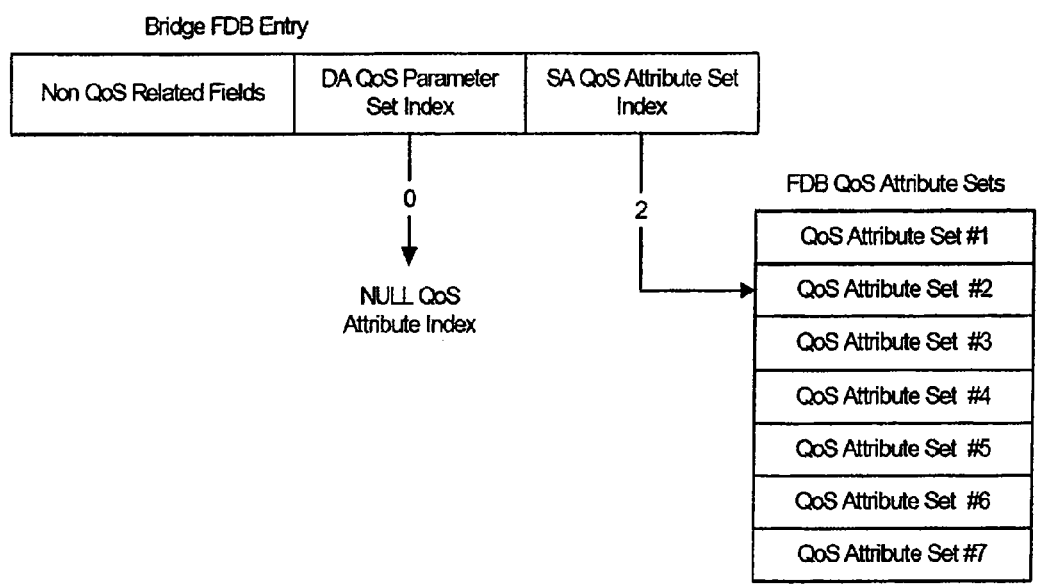
FIG. 5 is a simplified flow diagram illustrating the interactions between the FDB entry and the QoS attribute set index according to an embodiment of the present invention.

FIG. 4 is a simplified flowchart illustrating a Logical Interface and Tunnel-Termination-Based QoS Marking Operation according to an embodiment of the present invention. According to embodiments of the present invention, the marker operation is agnostic to QoS precedence assigned by port/protocol markers. Moreover, in an embodiment, the packet QoS attributes <QoS Precedence>, <Modify DSCP>, and <Modify User Priority> are re-assigned by this marker.

A packet is subject to tunnel-termination if its tunnel header matches a specific criteria. The device can terminate multiple tunnels, each of which has a different criteria and a configured action (part of the action is initial QoS marking). A packet subject to tunnel-termination marking is received at step 410. A determination is made (412) of whether to trust the tunnel-header. If the tunnel-header is trusted, a determination is made of whether to trust the EXP field and whether the tunnel-header is MPLS. If these conditions are met, the packet QoS Profile Index is assigned based on an EXP-to-QoS-Profile mapping (416). As illustrated in FIG. 4, the outer label is used. If these conditions are not met, the packet QoS Profile Index is assigned based on the port/protocol-based QoS marker (420). After assignment of the packet QoS Profile Index, the other packet QoS attributes <QoS Precedence>, <Modify DSCP>, and <Modify User Priority> are based on the tunnel-termination configuration (418).

According to some embodiments, the determination of whether to trust the EXP field and whether the tunnel-header is MPLS is made as part of the port marking operation illustrated in FIG. 3. In embodiments in which these processes are performed during port marking operations, decision point 414 and marking operation 416 are inserted after step 322 of FIG. 3. In other embodiments, these determinations are performed as illustrated in FIG. 4. One of ordinary skill in the art would recognize many variations, modifications, and alternatives.

If the tunnel-header is not trusted then various trust modes are applied on the passenger header. A determination is made (422) of whether layer 3 trust mode is enabled and the passenger header is IPv4/v6. If layer 3 trust mode is enabled and the passenger header is IPv4/v6, an additional sub-mode of DSCP-to-DSCP remapping is optionally performed (424). According to embodiments of the present invention, the determination of whether to perform DSCP-to-DSCP mapping is made using conventional methods. To perform DSCP-to-DSCP remapping, a global DSCP-to-DSCP mapping table is used to map the incoming packet to a new, mutated DSCP (426). If remapping is not performed, the DSCP is assigned based on the packet DSCP (428). In step 430, the packet QoS Profile Index is assigned based on the DSCP-to-QoS-Profile mapping.

If layer 3 trust mode is not enabled or if the passenger header is not IPv4/v6, a determination is made (422) of whether the layer 2 User Priority trust mode is enabled and whether the passenger header is tagged. In this context, tagged implies 802.1 Q-tagging. If these conditions are met, the packet QoS Profile Index is assigned by mapping the packet User Priority to a QoS Profile (432) using a global User-Priority-to-QoS-Profile-Index mapping table. If layer 2 User Priority trust mode is not enabled or the passenger header is not tagged, the packet QoS Profile Index is assigned based on the tunnel-termination default QoS Profile (434).

The QoS marker configuration per tunnel-termination entry is provided according to an embodiment of the present invention through the use of a number of parameters. The following in merely an exemplary embodiment and is not intended to limit the scope of the present invention. A Trust Tunnel-Header parameter with a width of 1 bit defines whether the passenger header is trusted (value of 0) or whether the tunnel header is trusted (value of 1). A Trust MPLS-EXP parameter with a width of 1 bit use used for packets with an MPLS tunnel-header and a Trust Tunnel-Header value of 1. If the value of the Trust MPLS-EXP is 0, the packet QoS Profile is preserved as assigned by the port/protocol QoS markers. If the value is 1, the packet QoS Profile is assigned by mapping the EXP field of the outer MPLS label, using the EXP-to-QoSProfile mapping table.

The Trust L2 and L3 parameters, as well as the enable DSCP to DSCP mutation parameter are 1 bit fields that are the same as the port-based marker, but use the passenger header information. These parameters are used for packets with the Trust Tunnel-Header value of 0. The User Priority to QoS- Profile mapping table uses the port based User Priority-to-QoSProfile table. The DSCP to QoS Profile mapping uses the port-based DSCP-to-QoS Profile table. The DSCP to DSCP mutation uses the port-based DSCP-to-DSCP table.

The Enable Modify User Priority, Enable Modify DSCP, and QoS Precedence are 1 bit fields that are the same as the port-based marker. These settings override the assignments by the port/protocol-based QoS markers. The Tunnel-Termination entry for the default QoS Profile Index is the 7 bit Default QoS Profile field and the Default User Priority overrides assignment of the default 801.p User Priority.

Policy-Based QoS Marking

The policy-based QoS marker provides per-flow assignment of the following QoS attributes:

QoS Precedence
QoS Profile Index
Modify DSCP
Modify User Priority flag

The policy-based QoS marker allows the application to perform QoS marking based on Layer 2 to Layer 4 packet information, as well as on device parameters such as the ingress port and the packet QoS Profile. The policy QoS marker has the ability to independently assign a new value or maintain the existing value for the QoS Profile Index, Enable Modify DSCP, and Enable Modify User Priority flags. However the QoS Precedence is always updated by a matching policy rule action.

The Policy engine supports two lookup cycles per packet, while maintaining wire-speed performance. Even though the device can perform QoS marking on either lookup (or on both lookups), it is common practice to dedicate the second lookup to implementing QoS policy rules, while the first lookup is dedicated to security access rules.

Bridge FDB-Based QoS Marking

The Bridge Forwarding Database-Based (FDB-Based) QoS marker performs initial marking of the following QoS attributes:

QoS Precedence
QoS Profile Index
Modify DSCP flag
Modify User Priority flag

The QoS marking is based on the Bridge FDB source and destination lookup, but is decoupled from the bridge forwarding decision. For example, FDB-based QoS marking still applies, even though the forwarding decision is not based on the FDB (e.g., the packet is forwarded based on the Private VLAN Edge (PVE). The FDB-based QoS marker supports seven QoS attribute sets, indexed 1 through 7. QoS attribute set 0 is the NULL set, which implies that FDB-based QoS is not applied to the packet. An FDB entry contains the following two fields:

<DA QoS attribute set index>: QoS attribute set applied to the packet if there is a destination lookup match.
<SA QoS attribute set index>: QoS attribute set applied to the packet if there is a source lookup match.

FIG. 4 is a simplified flow diagram illustrating the interactions between the FDB entry and the QoS attribute set index according to an embodiment of the present invention. FIG. 4 illustrates a MAC-Address-Based QoS marker configuration and shows an FDB entry that applies QoS attribute set #2 for a source lookup match and it preserves the previous QoS marking for a destination lookup match. An example application is to mark all packets sourced by a specific device (e.g., an IP phone or a video streamer) with an appropriate QoS.

A lookup failure is implicitly assigned the NULL FDB QoS attribute index. In the event that both the source and destination FDB lookups find a matching entry whose attribute index is not NULL, a global FDB QoS Marking Conflict Resolution command selects either the source lookup attribute index or the destination lookup attribute index. The QoS marking commands selection process and FDB-based QoS Marking Resolution utilizes two indexes, (Source Lookup FDB QoS Attribute, Destination Lookup FDB QoS Attribute). If the packet QoS information is preserved, the indices are (NULL,NULL). The MAC-DA marker is applied, the indices are (NULL, Valid). If the MAC-SA marker is applied, the indices are (Valid, NULL). If both indices are valid, the marking command is selected according to the global FDB QoS Marking Conflict Resolution command.

Router-Based QoS Marking

The 98DX255/265/275/285 router provides the following QoS service:

QoS marking based on IP Destination Address for routed UC traffic or based on (S,G) for routed MC traffic.
QoS based routing.

With respect to QoS marking, the QoS-marker offers the ability to initially mark the QoS attributes on a per route entry granularity. The marker can update the following QoS attributes:

QoS Precedence
QoS Profile Index
Modify DSCP flag
Modify User Priority flag

Generally, for IPv4/v6 Multicast packets, if the route entry overrides the QoS attributes, the updated QoS attributes are applied only to the routed packet replications, not to the bridged packet. With respect to QoS routing, In QoS networks, multiple paths exist for a given Unicast destination prefix or Multicast pair (S, G) or (*, G); and the path selection is based on the packet QoS Profile.

Tunnel-Start QoS Marking

The Tunnel-Start QoS marker performs initial marking of the following QoS attributes:

QoS Precedence
QoS Profile Index
Modify DSCP flag
Modify User Priority flag

According to some embodiments, if the packet is switched or routed to a tunnel-start interface, the configured tunnel-start header is prepended to the Layer 2 or Layer 3 passenger packet. The Tunnel-Start QoS marker sets the QoS fields of the tunnel-header. For packets sent to IP tunnels, the QoS attributes include User-Priority and DSCP. For packets sent to MPLS tunnels, the QoS attributes are User-Priority and the EXP fields of the two MPLS labels. The Tunnel-Start entry offers two separate QoS marking modes, one for the User-Priority and one for the DSCP/EXP: 1) Mark based on the packet QoS Profile Index assignment, or 2) Mark based on the explicit QoS fields in the Tunnel-Start entry.

If the Tunnel-Start QoS mode is based on the packet QoS Profile Index assignment, the QoS Profile Table entry provides the tunnel header User-Priority, and/or the DSCP/EXP. If the Tunnel-Start QoS mode is based on the explicit QoS fields in the Tunnel-Start entry, the tunnel header User-Priority, and/or DSCP/EXP are taken from the Tunnel-Start table entry. If the Tunnel-Start packet is sent over a cascade port, the QoS-Profile field in the DSA-tag of FORWARD packets reflects the QoS-Profiles assigned to the packet by the ingress QoS markers/Policy engine.

Merely by way of example, the following description illustrates several applications available according to embodiments of the present invention. In some embodiments, the most basic QoS application provides the service assignment modes. For the illustrated applications, it is assumed that the Nested VLANs feature is disabled.

As will be evident to one of skill in the art, the device port-based QoS marker configuration spans a wider range of capabilities than described here. The applications described herein merely describe the common modes from the network user's perspective. Additional details related to the description of the port-based QoS marker are provided throughout the present specification.

The QoS Blind Mode is a mode in which the QoS is disabled. The device operates in a best effort network. All traffic is serviced equally. In this mode, the port is not QoS-aware. Thus, all traffic ingressing at this port is assigned a single, port default, QoS Profile Index. The packet DSCP and User Priority fields are not modified.

The Network/DiffServ Boundary Mode operates in an Untrust mode. The port operates at the network edge, but service information from outside the network, embedded in packet DSCP and User Priority fields, can't be trusted. All traffic ingressing at this port is assigned a single, port default, QoS Profile Index. The packet DSCP and User Priority fields are optionally modified to convey service information to the next switches/routers along the packet path.

The Network/DiffServ Core Mode operates in several modes. A first mode is Trust L2 802.1p User Priority. The port operates at the network core and only the User Priority field of the arriving packets can be trusted. This is a typical situation where the network edge switches are incapable of marking the packet DSCP to convey service information to the core switch/routers, or the traffic isn't IP. The QoS Profile Index is set according to packet User Priority field if the packet is tagged, or to port default for untagged packets. The packet DSCP is modified to convey service information to the next switches/routers along the packet path.

Another of the Network/DiffServ Core modes is Trust L3 DSCP. The port operates at the network core or the port is located at the edge of a trusted DiffServ domain. Therefore, the DSCP field of the arriving packets can be trusted. If the port is located at the edge of a trusted DiffServ domain, a DSCP to DSCP mapping may be performed to support DiffServ domain crossing. The packet DSCP is used for DSCP to DSCP mutation. If the packet is non-IP, the DSCP mutation stage is skipped.

The QoS Profile Index is set according to packet/mutated DSCP if the packet is IPv4/6, or set to port default for non-IP packets. The packet User Priority is optionally modified to convey service information to the next switches/routers along the packet path, which may not be able to assign service based on the DSCP field. If the DSCP field is mutated, the packet DSCP field is modified to reflect the correct service information to the network core.

Yet another of the Network/DiffServ Core modes is Trust L3+L2. The port operates at the network core and both DSCP and User Priority fields of the arriving packets can be trusted. For IP packets, the QoS Profile Index is set according to the packet DSCP. For tagged non-IP packets, the QoS Profile Index is set according to User Priority. For untagged non-IP packets, the QoS Profile Index is set according to port default. The packet DSCP and User Priority fields are not modified. According to embodiments of the present invention, in Trust L3+L2 mode, the device provides up to 64 service levels to IP traffic and eight service levels to non-IP traffic, concurrently.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of processing packets in a network device, the method comprising:
   receiving a data packet at a port of a network device, wherein the data packet includes at least one externally assigned Quality of Service (QoS) attribute that is compliant with a communications protocol;
   assigning at the network device at least one internal QoS attribute for use in processing the received data packet within the network device, wherein the at least one internal QoS attribute is based on the at least one external QoS attribute and wherein the at least one internal QoS attribute is independent of a specific communications protocol; and
   processing the data packet through the network device using the assigned at least one internal QoS attribute.

2. The method of claim 1 wherein the at least one internal QoS attribute is one of a plurality of internal QoS attributes included within a QoS table stored by the network device, the at least one internal QoS attribute being mapped from the external QoS attribute based on the QoS table.

3. The method of claim 1 wherein the communications protocol is one of a plurality of communications protocols and wherein the at least one internal QoS attribute defines an internal QoS Profile, the internal QoS Profile being configurable to extend to other communications protocols not within the plurality of communications protocols.

4. The method of claim 1 further comprising setting a second external QoS attribute prior to egress of the data packet from the network device, the second external QoS attribute being compliant with a second communications protocol used for transmission of the data packet from the network device.

5. The method of claim 4 wherein the external QoS attribute and the second external QoS attribute are the same.

6. The method of claim 4 wherein the external QoS attribute and the second external QoS attribute are different.

7. The method of claim 4 wherein the second communications protocol used for transmission of the data packet from the network device is based on the communications protocol associated with the receipt of the data packet at the port of the network device.

8. The method of claim 4 wherein the second communications protocol used for transmission of the data packet from the network device is different from the communications protocol associated with the receipt of the data packet at the port of the network device.

9. The method of claim 1 wherein the at least one internal QoS attribute is independent of the communications protocol associated with the received data packet.

10. The method of claim 1 wherein the at least one internal QoS attribute comprises a first number of bits that is greater than a second number of bits comprised by the external QoS attribute.

11. A network device that processes data packet traffic over a telecommunication network, the network device comprising:
   an ingress pipeline that receives a data packet at a port of the network device, wherein the data packet includes an external assigned Quality of Service (QoS) that is compliant with a communications protocol; and a processor configured to:
> assign at the network device at least one internal QoS attribute for use in processing the received data packet within the network device, wherein the at least one internal QoS attribute is based on the external QoS attribute and wherein the at least one internal QoS attribute is independent of a specific communications protocol; and
>
> process the data packet through the network device using the assigned at least one internal QoS attribute.

12. The network device of claim 11 wherein the at least one internal QoS attribute is one of a plurality of internal QoS attributes included within a QoS table stored by the network device, the at least one internal QoS attribute being mapped from the external QoS attribute based on the QoS table.

13. The network device of claim 11 wherein the communications protocol is one of a plurality of communications protocols and wherein the at least one internal QoS attribute defines an internal QoS Profile, the internal QoS Profile being configurable to extend to other communications protocols not within the plurality of communications protocols.

14. The network device of claim 11 further comprising an egress pipeline that sets a second external QoS attribute prior to egress of the data packet from the network device, the second external QoS attribute being compliant with a second communications protocol used for transmission of the data packet from the network device.

15. The network device of claim 14 wherein the external QoS attribute and the second external QoS attribute are the same.

16. The network device of claim 14 wherein the external QoS attribute and the second external QoS attribute are different.

17. The network device of claim 14 wherein the second communications protocol used for transmission of the data packet from the network device is based on the communications protocol associated with the receipt of the data packet at the port of the network device.

18. The network device of claim 14 wherein the second communications protocol used for transmission the data packet from the network device is different from the communications protocol associated with the receipt of the data packet at the port of the network device.

19. The network device of claim 11 wherein the internal QoS attribute is independent of the communications protocol associated with the received data packet.

20. The network device of claim 11 wherein the at least one internal QoS attribute comprises a first number of bits that is greater than a second number of bits comprised by the external QoS attribute.

* * * * *